Figure 1:
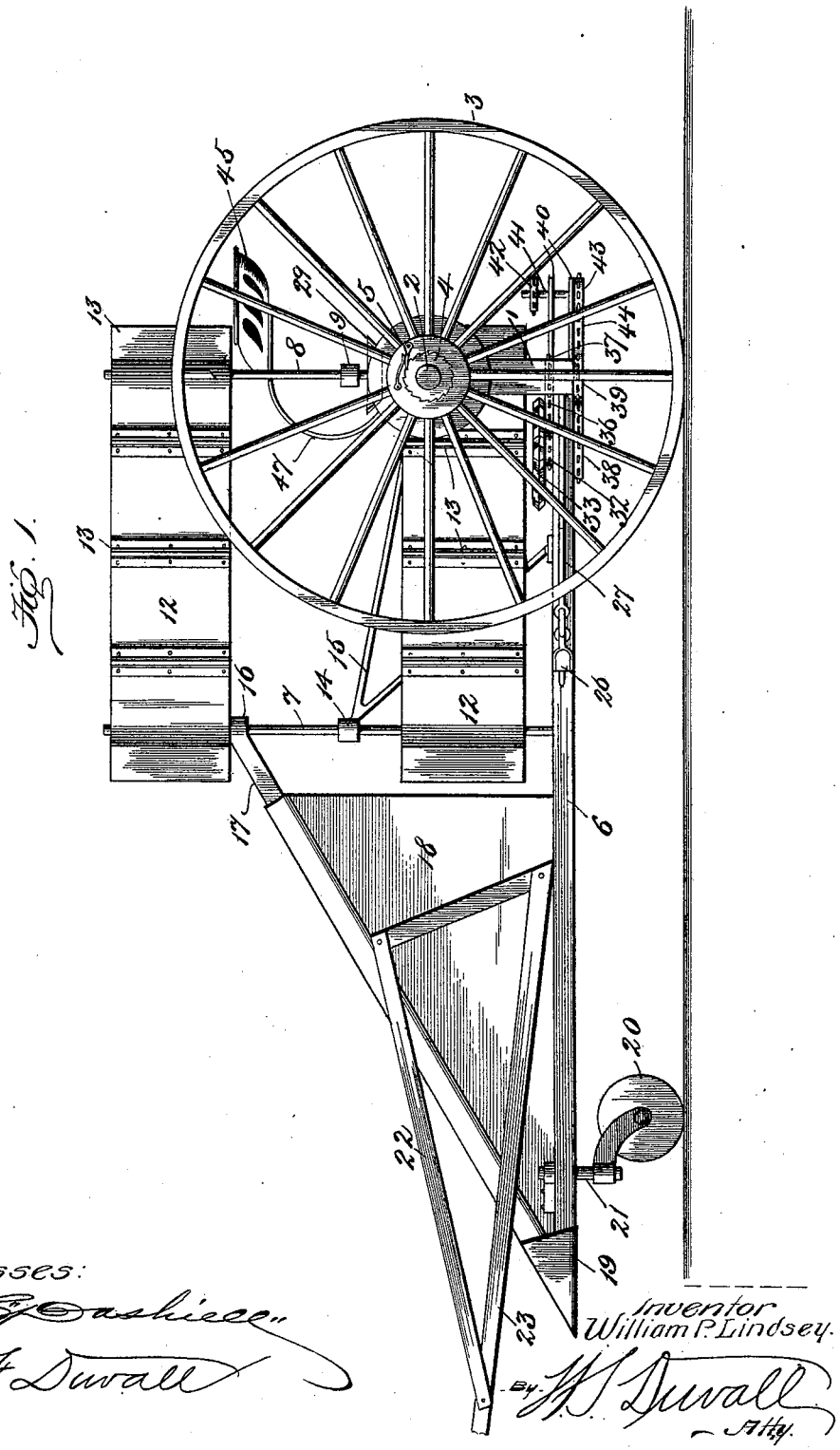

(No Model.)  3 Sheets—Sheet 1.

W. P. LINDSEY.
CORN HARVESTER.

No. 582,654. Patented May 18, 1897.

Witnesses:

Inventor
William P. Lindsey.
By J. J. Duvall
Atty.

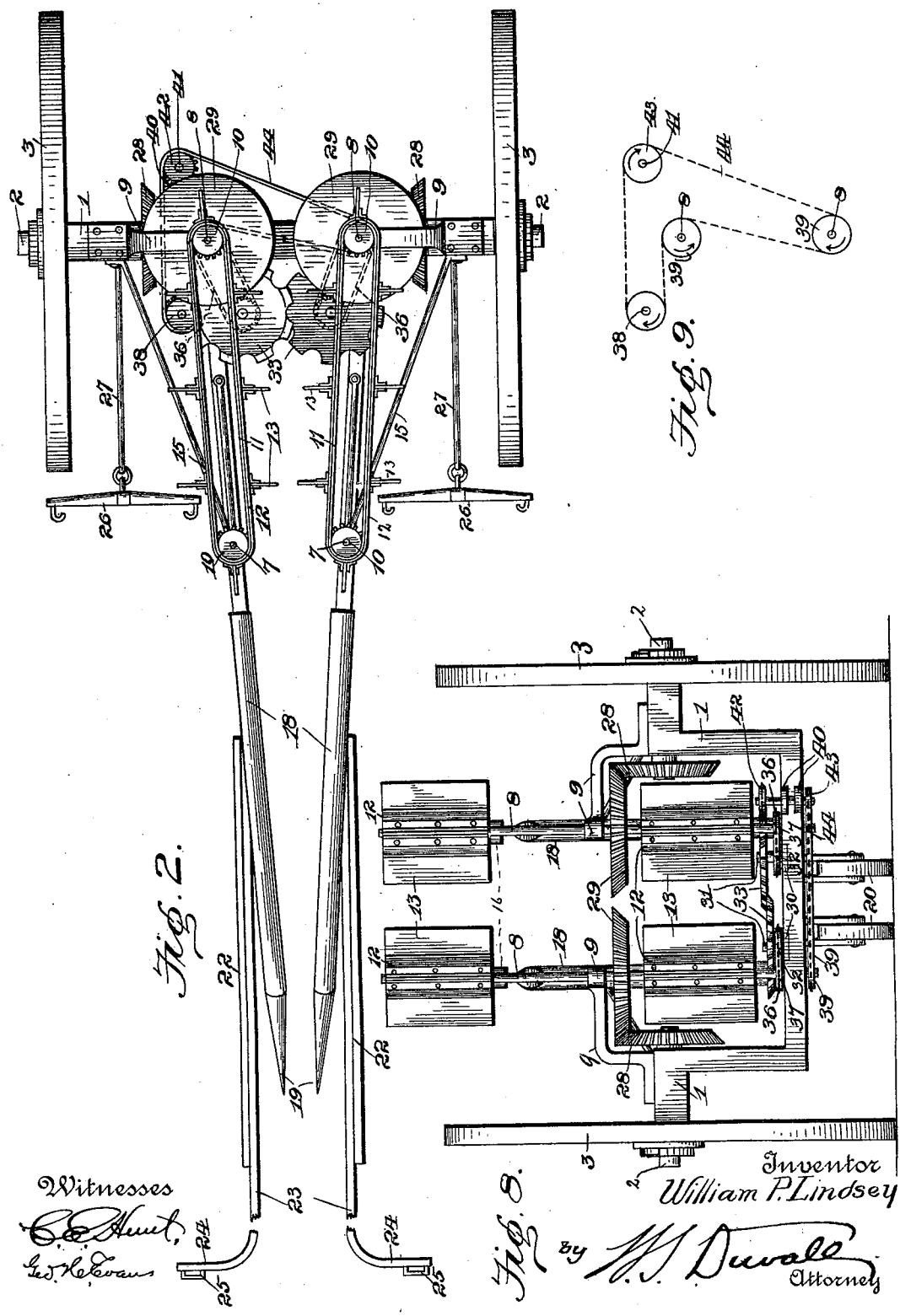

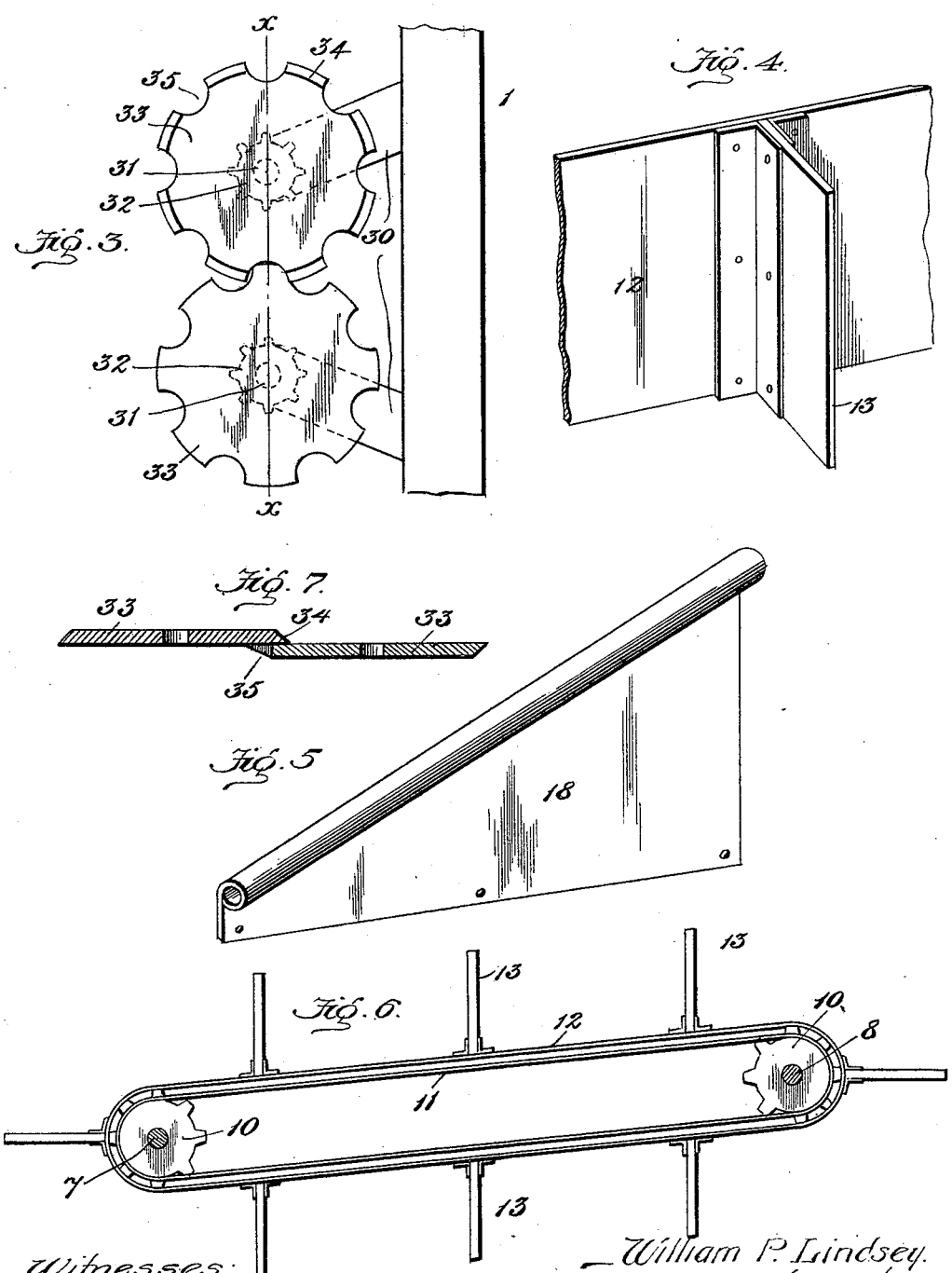

UNITED STATES PATENT OFFICE.

WILLIAM P. LINDSEY, OF FARMER CITY, ILLINOIS.

CORN-HARVESTER.

SPECIFICATION forming part of Letters Patent No. 582,654, dated May 18, 1897.

Application filed August 27, 1896. Serial No. 604,106. (No model.)

*To all whom it may concern:*

Be it known that I, WILLIAM P. LINDSEY, a citizen of the United States, residing at Farmer City, in the county of De Witt and State of Illinois, have invented certain new and useful Improvements in Corn-Harvesters; and I do hereby declare the following to be a full, clear, and exact description of the invention, such as will enable others skilled in the art to which it appertains to make and use the same.

My invention relates to improvements in corn-harvesters.

The objects in view are to produce a simple and inexpensive construction of harvester that is adapted to successively cut and gather in rows of standing corn for the purpose of binding the same into sheaves, said machine being so constructed as to handle the corn expeditiously and without injury and which will make a positive shear cut; furthermore, to lighten and centralize the draft of the machine, whereby the same may be readily drawn along opposite sides of a row of standing corn.

Various other objects and advantages of the invention will hereinafter appear, and the novel features thereof will be particularly pointed out in the appended claims.

Referring to the drawings, Figure 1 is a side elevation of the corn-harvester constructed in accordance with my invention. Fig. 2 is plan view of the same. Fig. 3 is a detail in plan of the rotary cutters. Fig. 4 is a perspective view of a portion of one of the gathering-belts and its flight. Fig. 5 is a detail in perspective of one of the triangular metallic side shields. Fig. 6 is a plan view in detail of one of the gathering-belts. Fig. 7 is a cross-section through the cutters on the line $xx$ of Fig. 3. Fig. 8 is a rear end elevation of the machine on a reduced scale. Fig. 9 is a diagrammatic view of the auxiliary driving mechanism for the cutters.

Like numerals of reference indicate like parts in all the figures of the drawings.

In practicing my invention I construct a framework that is as light as is consistent with the weight of the mechanism that is supported thereby. The framework comprises a rear transverse drop-bar 1, the two ends of which are elevated above the middle and are longitudinally bored, so as to receive and form the bearings for two independent journals or axles 2. These journals or axles project beyond their bearings, and at their outer extremities have mounted thereon for loose independent rotation opposite ground-wheels 3. Ratchet-wheels 4 are secured upon the outer extremities of the journals and, being fast, move therewith. Spring-pressed pawls 5 are secured to the hubs of the ground-wheels 3 and operatively engage with and rotate the ratchet-wheels and their journals, together with all mechanism carried thereby, when the said ground-wheels move forward, but slip idly over the ratchet-wheels when moving backward or turning around at the end of a row. Projecting forwardly from the drop-bar 1, at opposite sides of the center thereof, is a pair of forwardly-converging frame-bars 6, and journaled in said frame-bars at about their middles is a pair of opposite vertical shafts 7. A corresponding pair of shafts 8 is located in rear of the shafts 7 and is journaled in suitable bearing-arms 9, that are located on the ends of the drop-bar 1, from which they inwardly project, and in suitable openings formed in the drop-bar.

Each of the shafts 7 and 8 is provided near their upper and lower ends with sprocket-wheels 10, and connecting each pair of front and rear sprocket-wheels is a sprocket-belt 11. Each of the belts 11 supports and carries a gathering-belt 12, from whose outer face projects a series of slightly-flexible outstanding rubber flights 13. The front shafts 7 are journaled at their lower ends in the two frame-bars 6 and about midway their ends in journal-boxes 14, formed at the forward ends of a pair of brace-frames 15.

Connected at their rear ends to the forward shafts 7, immediately below the upper gathering-belts 12, and provided with journal eyes or boxes 16 is a pair of inclined forwardly-disposed bars 17, whose front ends terminate coincident with and are secured to the front ends of the frame-bars 6. Metal shields 18, having a general triangular shape, have their upper edges folded about the inclined bars 17, so as to offer a smooth surface, and at their lower ends are connected to the frame-bars 6, thus covering the intervening space between the bars 6 and 17. The apex of the triangle produced by the bars 17 and 6 at each side of the machine has fitted thereover a pointed metallic shoe 19.

The front of the machine is supported and adapted to turn upon a pair of caster-wheels 20, that are journaled in a pair of swiveled caster-frames 21, that are secured to the frame-bars 6, immediately in rear of the shoes 19.

Outside of the shields 18 and secured to the frame-bars there is located a pair of triangular draft-frames 22, the lower bar 23 of which after extending a suitable distance forward is deflected or turned outward, so as to produce a breast-yoke 24, and is provided with a staple 25 to receive a strap for connecting the same to the collar of the harness of the draft-animal at that side of the machine. The traces of the harness are connected to the ends of a singletree 26, and a draft-rod 27 connects the singletree to the drop-bar 1 at an intermediate point between the ground-wheel and frame-bar 6. This draft mechanism it will be seen is duplicated at each side of the machine, so that the horses or other draft-animals travel at opposite sides of a row of corn, while the stalks of the latter pass successively between the shoes 19 and are carried by the rubber flights 13 and presented to the cutters, which will be hereinafter described.

The inner ends of the journals or axles 2 are provided with large beveled gear-wheels 28, which in turn mesh with and drive corresponding beveled gear-wheels 29, that are located upon the lower ends of the rear shafts 8.

Supported in forwardly-projecting arms 30, secured to the drop-bar 1 at opposite sides of its center, are loosely-journaled vertical shafts 31, and upon each is mounted a sprocket-wheel 32 and a rotary cutter 33, all of which are designed to move with the shaft. The form of cutter is best illustrated in Fig. 3 of the drawings, wherein it will be seen that the edge of each cutter is provided at intervals with beveled cutting-teeth 34 and that the teeth of one cutter alternate with those of a companion cutter, so that each cutter alternately severs a stalk, and that the beveled cutting-tooth of one cutter will operate against the straight edge of its companion. The plain faces of the cutters are arranged adjacent to each other, as is obvious. Between the teeth recesses 35 are produced, and these latter are not beveled, but present plain angular edges, as is best shown in Fig. 7 of the drawings. The cutters are operated in unison with the gathering-belts by means of sprocket belts or chains 36, which engage with the sprocket-wheels 32 on the cutter-wheel shafts 31 and with sprocket-wheels 37, located near the lower ends of the shafts 8.

In order that the cutter-wheels 33 may operate in unison when the machine is being turned and so preserve the relative location of the teeth of one cutter to the concavity of the opposed cutter, the following auxiliary driving mechanism is provided, viz: 39 39 are sprocket-wheels on the shafts 8 8 below the drop-bar, and 38 43 are idle sprocket-wheels at the forward and rear ends, respectively, of a longitudinally-extending bracket 40, mounted on the drop-bar 1 at one end of the lower horizontal member. 44 is a sprocket-chain passing around the sprockets 38 39 39 43, as shown in dotted lines, Fig. 2, and more clearly shown in Fig. 9. It will be seen, therefore, that when the machine is being turned one of the axles 2 will fail to be rotated by the ground-wheel, whereupon the chain 44 will be operated from the shaft 8, geared to the forwardly-moving ground-wheel, and this chain 44 will rotate the other shaft 8, so that the cutters will be rotated and their positions be unchanged. The axle 2 of that ground-wheel which is not moving forwardly will be rotated forwardly by the gears 29 28, as said axle 2 is loose and its ratchet will be rotated forwardly under its pawl till the machine is again started forward. Thus all special adjustment of the cutters at the beginning of a row of corn will be avoided.

The usual seat 45 is employed for the accommodation of the driver, and which is comfortably supported upon a spring-standard 47, that rises from one side of the drop-bar 1.

In operation the horses are driven along the opposite sides of a row of corn, and the stalks composing the row are successively passed between the metal shoes and shields to points where they are carefully engaged at their upper and lower ends by the inwardly-moving yielding flights 13, and by these flights are presented in a perfectly vertical position to the successive notches of the two cutter-wheels that alternately present themselves, the shear-like severing of the stalks being accomplished as they successively pass between the wheels.

Having described my invention, what I claim is—

1. A corn-harvester comprising the drop-axle having loose journals mounted on its oppositely-projecting ends, ground-wheels loose on the outer ends of said journals and clutched thereto to rotate the journals forwardly, the longitudinally-extending bars 6, spaced apart to receive a row of corn, secured at their rear ends to the lower member of the drop-axle and provided at their front ends with supporting-wheels, the front vertical shafts, 7, 7, the brace-frames 15, 15, secured to the bars 6, 6, and having bearings for said shafts, the vertical shafts 8, 8, at the rear ends of the bars 6, 6, the four longitudinally-extending endless gatherers 12 passed around wheels on the upper and lower portions of the shafts 7, 8, the bars 17 from the shafts 7 extending downwardly and forwardly to the front ends of the bars 6, the shields, 18, the cutter-wheels journaled in front of the shafts 8, sprocket wheels and chains connecting the cutter-shafts with the shafts 8 and bevel-gears connecting the shafts 8 with the loose ground-wheel journals, substantially as specified.

2. A corn-harvester comprising the drop-axle, 1, ground-wheels mounted at the ends thereof, the forwardly-extending bars 6, 6, secured at their rear ends to said axle and provided at their forward ends with supporting-wheels, the brace-frames 15, 15, secured at their rear ends to bars 6, 6, and the drop-axle, and provided with bearings 14, 14, at their forward ends, the forwardly and downwardly inclined bars 17 provided at their upper rear ends with bearings 16, 16, in vertical alinement with the bearings 14, the pointed shoes 19, connecting the forward ends of the bars 17, 6, the shields 18, 18 between the bars 17, 6, the draft-bars 23 extending forwardly from the bars 17, 6, and having lateral breast projections 24 at their forward ends, the single-tree-rods 27 extending forwardly from the ends of the drop-axle, vertical shafts, 7, 7, journaled in the bearings 14, 16, the rear vertical shafts, 8, 8, geared to the ground-wheels, endless gathering-belts mounted on the shafts 7, 8, and a cutting mechanism operated from the shafts 8 and located at the rear of the gathering-belts, substantially as specified.

3. The combination within a corn-harvester with the supporting-frame having loose journals, the ground-wheels mounted thereon and clutched to the journals to rotate them forwardly, and vertical shafts geared to the inner ends of the loose journals and each provided at its lower end with two sprocket-wheels, of cutter-wheels the shafts of which are each provided with a sprocket-wheel, independent chains connecting the cutter-wheel shafts with the respective upper sprockets of the vertical shafts, the idle-sprockets 38, 43, and the chain 44, connecting the lower sprockets of said vertical shafts and passing around the said idle-sprockets, substantially as specified.

4. In a corn-harvester, the combination with the framework, the supporting-wheels, having loose journals and means for clutching thereto the front and rear pairs of rotatable vertical shafts, sprocket-wheels carried thereby and flight-carrying gathering-belts connecting the sprocket-wheels, of means for conveying motion from each of the journals of the supporting-wheels to the rear pair of vertical shafts, rotary cutters arranged between the belts, shafts for the same, sprocket-wheels arranged on the shafts, connecting-chains between the same and sprocket-wheels on the rear shafts, additional sprocket-wheels on the lower ends of the rear shafts, and a chain connecting said additional sprocket-wheels, substantially as specified.

5. In a corn-harvester, the combination with a framework, independent journals arranged therein, ground-wheels arranged on the journals and pawl-and-ratchet mechanisms between the ground-wheels and journals, of a pair of cutting-disks having alternating cutting-teeth and intermediate recesses having angular edges against which said teeth operate, independent shafts for supporting the cutters, a gearing connecting the same so as to cause them to operate in unison and preserve their relative location, and independent means between each shaft and journal for causing motion to be conveyed from the latter to the former, substantially as specified.

In testimony whereof I affix my signature in presence of two witnesses.

WILLIAM P. LINDSEY.

Witnesses:
 ABE EVANS,
 FRANK L. CROSBY.